Dec. 29, 1936.    I. N. EUSTIS    2,065,571
BRAKE SHOE
Filed Nov. 7, 1932
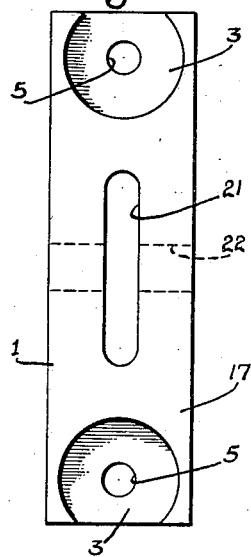
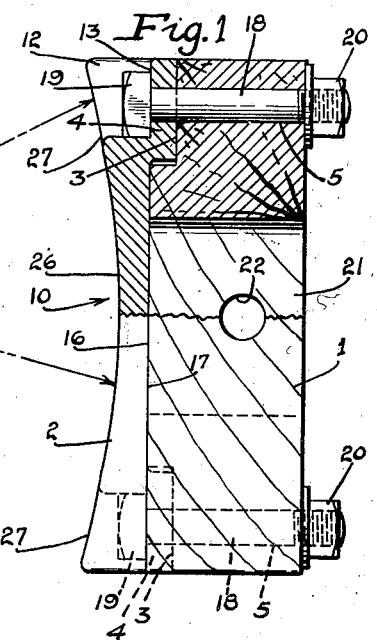
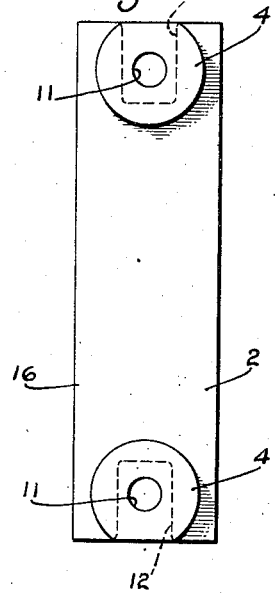
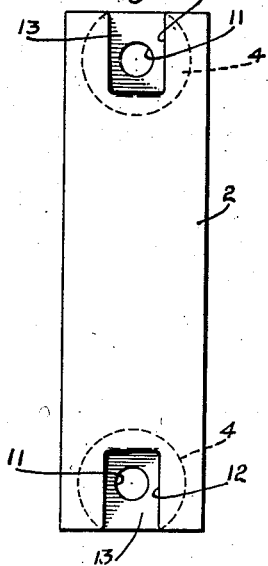
INVENTOR
IRVING N. EUSTIS
By Paul, Paul Moore
ATTORNEYS Patented Dec. 29, 1936

2,065,571

UNITED STATES PATENT OFFICE 2,065,571

BRAKE SHOE

Irving N. Eustis, Fairmont, Minn., assignor to Fairmont Railway Motors, Incorporated, Fairmont, Minn., a corporation of Minnesota Application November 7, 1932, Serial No. 641,533

2 Claims. (Cl. 188—242)

This invention relates to improvements in brake shoes and/or carriers therefor and has, among its objects, to provide means for facilitating assembly of the brake shoes on the carrier shoe; to provide a shoe having a wheel-engaging surface adapted for use on wheels of different sizes; and generally to provide an improved combination of shoe and carrier.

Objects, features and advantages of the invention will be set forth in the description of the drawing forming a part of this application, and in said drawing Figure 1 is a sectional side elevation of a brake shoe and carrier therefor constructed in accordance with the teachings of this invention;

Figure 2 is a front face view of the carrier, viewing that side which has the recesses;

Figure 3 is an elevation of the shoe, viewing it from the working face side; and Figure 4 is an elevation of the shoe, viewing it from that side which engages the carrier.

Referring to Figure 1: Numeral 1 indicates a wooden brake shoe carrier upon which a cast metal brake shoe or liner 2 is mounted. On that face which is engaged by the rear face of the shoe, the carrier has locating recesses 3, and on its rear face, the liner has corresponding locating bosses 4, one for each recess and releasably fitting the corresponding recesses. There are bolt holes 5 in the carrier passing therethrough and each opens into the corresponding recess. The shoe has bolt holes 11 in register with the holes 5 of the carrier and these holes pass through the bosses. In this case, the bosses and recesses are cylindrical, and their axes are concentric with the axes of the bolt holes.

The bosses 4 and recesses 3 intersect the end faces of their respective elements so that the recesses are open at the ends. These bosses and recesses greatly facilitate assembly of the shoe on the carrier by obtaining a colinear registration of the bolt holes. Moreover, they function to prevent assembly of the wrong shoe.

The liner has a concave wheel-engaging surface generally indicated 10, which may have the ordinary configuration (not shown) or a special configuration, hereinafter described.

The shoe 2 has bolt-head receiving recesses 12 which extend inwardly from the concave face 10, and the bottoms 13 of these recesses are coplanar with the rear face 16 of the shoe which engages flatly against the corresponding front face 17 of the carrier. Bolts 18 secure the parts together, the square heads 19 of which lie in the recesses 12. The depth of the recesses is greater than the thickness of the bolt-heads so that the heads lie well inwardly from the concave braking surface 10. The bolts have suitable nuts 20, the carrier has the usual slot 21 for the reception of the brake beam, and the usual bolt opening 22 traversing the carrier and slot 21. The bolt-head receiving recesses 12 are herein shown as rectangular but they may be of any polygonal shape to correspond to the polygonal shape of a bolt head, the head and recesses being shaped to cooperate or fit to prevent rotation of the bolt.

A feature of this invention is the provision in a brake shoe or liner, of a concave wheel-engaging face comprising portions having different radii of generation, whereby the braking surface is adapted for use with a plurality of sizes of wheels having tread surfaces of corresponding curvatures.

Referring to Figure 1: The middle portion 26 of the wheel-engaging face 10 has a radius of generation A, centered at B. The terminal portions 27 at each side of the middle portion 26 have a common radius of generation C, centered at D. Let it be supposed that radius A is eight inches, and radius C ten inches. When this brake shoe is used, for example with a twenty inch wheel, the outer portions 27 fit the tread and provide the required braking surface. These surfaces are more or less quickly worn down so that the surface portion 26 eventually also participates in braking action. When the shoe is applied to the sixteen inch wheel, the center portion 26 of the braking surface fits the tread, and as wear takes place, the area of contact is increased until the surface portions 27 join in the braking action. In other words, in each case, all portions of the concave face become active for braking purposes.

An important object is to provide shoes adapted for different sizes of wheels, but to so construct the shoes that they will all fit and only fit a standard carrier, in a certain manner, so that replacement can only be made with a liner which fits the carrier. By providing sockets having a particular configuration or arranged in a particular manner, which will register with or fit bosses having a corresponding configuration or arrangement, quick registration between the bolt holes of the shoe and carrier can be obtained. There is, therefore, no intention to be entirely limited to the specific arrangement, location, or configuration of the bosses and sockets.

I claim:

1. A brake shoe carrier element having a flat face having terminal recesses therein, a brake shoe having a flat face engaging the flat face of the carrier and having terminal locating and reenforcing bosses fitting the recesses, the wheel-engaging face of the shoe being concave toward the flat face and having terminal bolt head countersinking recesses opposed to the bosses, securing bolts traversing openings in the bosses and carrier and having heads in the countersinking recesses, the bottom surfaces of the last named recesses being substantially coplanar with the flat face of the shoe, and the heads being of substantially less thickness than the depth of the recesses so that the shoe can be worn substantially through at its midportion before the wheel can engage the bolt heads.

2. A brake shoe having a concaved wheel-engaging face and a flat opposite face, bolt head receiving recesses extending inwardly from said concave face, bolt holes traversing the shoe and opening into said bolt-receiving recesses, a brake shoe carrier having a flat face engaging the flat face of the shoe having corresponding bolt hole openings in register with the openings of the shoe, locating thickening and reenforcing bosses on said shoe circumscribing the bolt holes and releasably fitting corresponding recesses in the carrier and headed bolts in the holes securing the shoe to the carrier and having their heads in the recesses of the shoe, the bolt head receiving recesses being of greater depth than the thickness of the bolt heads to obtain countersinking of the heads below the concave wheel-engaging face of the shoe in a manner to permit a substantial degree of wear of said concave face in a direction toward said flat face without wear of the bolt heads.

IRVING N. EUSTIS.